United States Patent [19]

Fittock et al.

[11] Patent Number: 6,048,506

[45] Date of Patent: *Apr. 11, 2000

[54] PROCESS FOR THE REMOVAL OF CATIONIC IMPURITIES FROM A COBALT SULPHATE SOLUTION

[75] Inventors: John E. Fittock, Townsville; Malcolm J. Price, Maleny; John G. Reid, Townsville, all of Australia

[73] Assignee: Queensland Nickel Pty. Ltd., Queensland, Australia

[ * ] Notice: This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/754,175

[22] Filed: Nov. 25, 1996

Related U.S. Application Data

[63] Continuation-in-part of application No. 08/329,848, Oct. 27, 1994, Pat. No. 5,605,668.

[30] Foreign Application Priority Data

Oct. 29, 1993 [AT] Austria .................................. PM 2092

[51] Int. Cl.[7] ......................... C22B 19/00; C01G 49/00; C01G 51/00
[52] U.S. Cl. ............................................. 423/99; 423/139
[58] Field of Search .................... 423/99, 139, 150.1; 210/634, 638

[56] References Cited

U.S. PATENT DOCUMENTS

| | | | |
|---|---|---|---|
| 3,767,762 | 10/1973 | Kunda | 423/145 |
| 3,907,966 | 9/1975 | Skarbo | 423/139 |
| 3,966,569 | 6/1976 | Reinhardt et al. | 423/100 |
| 3,981,968 | 9/1976 | Miller et al. | 423/139 |
| 4,053,553 | 10/1977 | Reinhardt et al. | 423/139 |
| 4,153,522 | 5/1979 | Arbiter et al. | 423/109 |
| 4,348,367 | 9/1982 | Rickelton et al. | 423/139 |
| 4,353,883 | 10/1982 | Rickelton et al. | 423/139 |
| 4,374,780 | 2/1983 | Robertson | 423/139 |
| 4,432,953 | 2/1984 | Hubred et al. | 423/139 |
| 4,434,141 | 2/1984 | Hubred et al. | 423/139 |
| 4,514,369 | 4/1985 | Hubred et al. | 423/139 |
| 4,515,757 | 5/1985 | Hubred et al. | 423/139 |
| 4,563,213 | 1/1986 | Hubred | 423/139 |
| 4,600,435 | 7/1986 | Wiegers et al. | 423/139 |
| 4,610,861 | 9/1986 | Babjak | 423/139 |
| 4,900,522 | 2/1990 | Chou et al. | 423/139 |
| 4,956,154 | 9/1990 | Magdics et al. | 423/139 |
| 5,010,049 | 4/1991 | Villa-Garcia et al. | 502/60 |
| 5,135,652 | 8/1992 | Boateng | 423/99 |
| 5,174,812 | 12/1992 | Price et al. | 423/139 |
| 5,228,903 | 7/1993 | O'Keefe | 423/139 |

FOREIGN PATENT DOCUMENTS 27 35 684 2/1978 Germany .
WO 88/09389 12/1988 WIPO .

OTHER PUBLICATIONS

W.A. Rickelton et al., "Solvent Extraction with Organophosphines—Commercial & Potential Applications," *Separation Science and Technology*, vol. 23, No. 12 & 13, pp. 1227–1250, (1988), no month.

Miralles et al., "Solvent extraction of iron (III) by bis (2,4,4–trimethylpentyl) phosphinic acid: experimental equilibrium study", *Hydrometallurgy*, 31 (1992) pp. 1–12, no month.

Sastre et al., "Extraction Of Divalent Metals With Bis (2,4,4–Trmethylpentyl)Phosphinic Acid.", *Solvent Extraction And Ion Exchange*, 8(4&5), (1990), pp. 597–614, no month.

*Primary Examiner*—Steven Bos
*Attorney, Agent, or Firm*—Oliff & Berridge, PLC

[57] ABSTRACT

A process for the separation of unwanted ferric, iron and zinc impurities from a cobalt sulphate solution containing these impurities, the process including the steps of (i) reacting the cobalt sulphate solution with an organic reagent specific for the removal of iron and zinc at an initial pH of less 2.8 to remove the majority of the unwanted ferric iron impurities; and (ii) slowly raising the pH of the solution to about 3.5 in order to remove zinc impurities and any remaining ferric iron impurities.

19 Claims, 1 Drawing Sheet

PROCESS FOR THE REMOVAL OF CATIONIC IMPURITIES FROM A COBALT SULPHATE SOLUTION

This is a Continuation-in-Part of application Ser. No. 08/329,848, filed Oct. 27, 1994, now U.S. Pat. No. 5,605,668.

FIELD OF THE INVENTION

The present invention resides in a process for the removal of cationic impurities, in particular ferric iron and zinc impurities from a cobalt sulphate solution. This process of removing these unwanted cationic impurities allows for the preparation of a high purity cobalt intermediate, which is the subject of copending U.S. application Ser. No. 08/329,848, now U.S. Pat. No. 5,605,668, the subject matter of which is totally incorporated herein by reference.

BACKGROUND

In prior art processes, nickel and cobalt bearing ores and concentrates may, for example, be processed by the reduction roast ammonium carbonate oxidative leach route. By this route, impure cobalt sulphide is produced as a by-product, and the isolation and recovery of this by-product is illustrated in Australian Patent 605867.

The recovery of cobalt as a sulphide is achieved by injection of a suitable sulphiding agent, for example, gaseous hydrogen sulphide or ammonium hydrosulphide solution. This procedure however results in the precipitation of sulphides of other elements present such as iron, zinc, copper and nickel as well as the adsorption and or coprecipitation of compounds that normally do not produce insoluble sulphides, such as calcium, magnesium and manganese.

In order to produce pure cobalt metal or a pure cobalt compound for industrial applications it, is necessary to first solubilize the impure sulphides and then isolate the cobalt in a suitable form free of unwanted impurities.

A number of processes have been reported describing the isolation of cobalt as a pure product. These procedures usually involve a combination of solubilization, precipitation, solvent extraction and electrowinning operations. One such process, known as the Nippon Mining Corporation process, recovers cobalt in the metallic form by electrowinning from an acidic sulphate solution. Another process, known as the Sumitomo process, also recovers cobalt in metallic form. However, this is electrowon from a chloride solution. Both of these operations have common features in that the cobalt is present in the cobaltous state at the point of isolation and the produce is a massive metal cathode plate.

Another commercial cobalt sulphide refining process is the soluble cobaltic ammine process developed by Sherritt Gordon Mines Ltd. This process involves solubilization, precipitation of hydrated ferric oxide, conversion of the cobaltous sulphate to cabaltic pentaammine sulphate, precipitation of nickel ammonium sulphate, reduction of the cobaltic pentaammine to cobaltous diammine and, finally, pressure hydrogen reduction to cobalt metal powder.

Cobalt has many applications and not all of these require cobalt metal. For example, cobalt salts find use in a variety of industries and significant quantities of cobalt oxide is also used industrially. Consequently, a pure cobalt compound able to be converted to salts, oxides and fine metal powder would be a useful industrial commodity.

The present invention aims to overcome, or at least alleviate, one or more of the difficulties associated with the prior art.

SUMMARY OF THE INVENTION

The present invention relates to a suitable method of purifying cobalt by first removing from a cobalt solution unwanted cationic impurities. A pure cobalt product may then be produced by a combination of solubilization, solvent extraction and, optionally, ion exchange operations that allow cobalt to be recovered from a solution in which it is present in the cobaltic state.

The present invention resides in a process for the separation of unwanted ferric iron and zinc impurities from a cobalt sulphate solution containing these impurities, the process including the steps of:

(i) reacting the cobalt sulphate solution with an organic reagent specific for the removal of iron and zinc at an initial pH of less than 2.8 to remove the majority of the unwanted ferric iron impurities; and (ii) slowly raising the pH of the solution to about 3.5 in order to remove zinc impurities and any remaining ferric iron impurities

BRIEF DESCRIPTION OF THE DRAWING

By way of example, FIG. 1 provides a flow diagram of the process according to copending U.S. application Ser. No. 08/329,848, now U.S. Pat. No. 5,605,668, and the present invention. It will be appreciated that this chart is merely illustrative of a preferred embodiment of the invention, and the invention should not be considered limited thereto.

DESCRIPTION OF PREFERRED EMBODIMENTS

Figure 1:
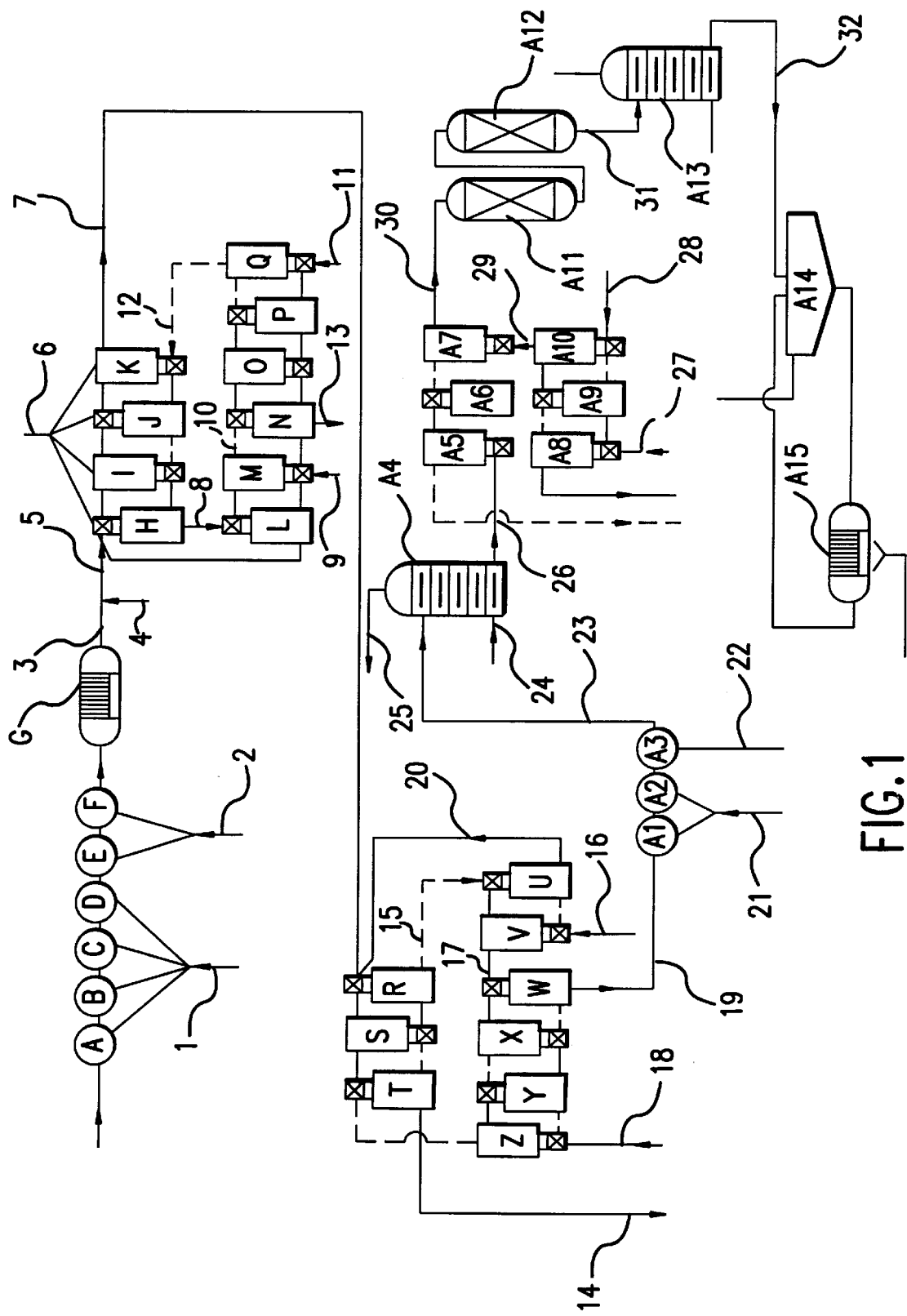

The process according to copending U.S. application Ser. No. 08/329,848, now U.S. Pat. No. 5,605,668, sequentially treats a cobalt containing solution to remove impurities such as iron, zinc, copper, manganese, nickel, magnesium and calcium and employs an acid/base solvent extraction transfer step to remove anionic impurities such as sulphate, chloride and nitrate. The present application is particularly concerned with the removal of ferric iron and zinc impurities from the cobalt solution.

The process of copending U.S. application Ser. No. 08/329,848, now U.S. Pat. No. 5,605,668, is particularly applicable to recovering cobalt from insoluble cobalt sulphide solids. Accordingly, in the process of this invention, impure cobalt containing solids are converted to a soluble form. The methods available to convert insoluble cobalt sulphide solids to soluble cobalt salts are varied and they generally require the injection of air or oxygen at atmospheric or higher pressure, into an aqueous slurry of the solids at elevated temperature. For the purposes of this solubilization step, it is preferred to inject air or oxygen at a temperature range of 60° C. to 90° C. at atmospheric pressure. The reaction period can be adjusted to achieve the degree of solubilization required. The temperature may be controlled by the circulation of water or steam. The end result is the production of a solution of cobalt sulphate of pH lower than 2.5 with cobalt concentration of 30 to 90 $gl^{-1}$, preferably about 50–65 $gl^{-1}$.

During the dissolution of the cobalt sulphide, the impurity elements present also dissolve. This allows the cobalt solution to be subjected to the appropriate purification steps. The Nippon Mining Corporation, Sumitomo and Sherritt Gordon processes each employ a precipitation step to remove iron as ferric hydroxide from the cobalt sulphate solution. However, when ferric hydroxide precipitates from cobalt-rich aqueous solutions, some cobalt is lost, adsorbed to, or coprecipitated with the ferric hydroxide solids. This represents a cobalt loss that is not easily reversed. Accordingly, the present invention employs an organic reagent or reagents specific for ferric iron and zinc at predetermined pH values to strip any iron and zinc from the solution without any significant loss of cobalt, which avoids the difficulty of the prior art processes.

It is particularly preferred that the organic reagent for the extraction of cationic impurities from the cobalt sulphate solution is specific for the extraction of ferric iron and zinc. It is most desirable that the iron present in the cobalt sulphate solution be ferric ($Fe^{3+}$) ions, and accordingly, the cobalt sulphate solution may be treated with a strong oxidant, for example hydrogen peroxide, to convert any iron present to ferric iron.

It should be appreciated that control of pH during solvent extraction is important if complete and selective separations are to be achieved. For the process of the present invention, it is most desired to maintain the pH value of the solution initially between a pH value of less than 2.8, preferably from about 2.1 to 2.6, which will generally separate about 95% of the ferric iron from the solution, and slowly raising the pH to about 3.5 specific for zinc separation. The present invention enables ferric iron and zinc to be selectively and effectively removed in sequence from the acidic cobalt sulphate solution.

A suitable organic reagent for this step has been found to be a phosphinic acid derivative dissolved in a kerosene solvent. For example, a preferred reagent is bis(2,4,4,trimethylpentyl)phosphinic acid in aliphatic kerosene (ESCAID 110). The ratios of these components may be adjusted to yield the required optimum extraction and stripping properties.

The effectiveness of the removal of iron and zinc from aqueous cobalt sulphate solution utilizing the above procedure is illustrated by the results in Table 1.

TABLE 1

|  | Co/Fe ratio | Co/Zn ratio |
|---|---|---|
| Cobalt Sulphate Feed Liquor | 100 | 30 |
| Treated Liquor | 40,000 | 150,000 |
| Loaded Strip Liquor | 0.0005 | 0.0001 |

The cobalt solution, free of zinc and iron cationic impurities, may then be utilized in a process to produce a high purity cobalt intermediate, in accordance with the process of copending U.S. application Ser. No. 08/329,848, now U.S. Pat. No. 5,605,668. A high purity cobalt intermediate may be produced if both the cationic and anionic impurities are removed. In accordance with the process of copending U.S. application Ser. No. 08/329,848, now U.S. Pat. No. 5,605,668, this may be achieved if the cobalt is transferred from an acidic sulphate medium to a basic ammoniacal ammonium carbonate medium.

Consideration of the nature of the desired high purity cobalt intermediate requires that not only cationic but also anionic impurities need to be removed. It has been found that this may be achieved if the cobalt is transferred from an acidic sulphate medium to a basic ammoniacal ammonium carbonate medium.

In order to transfer the cobalt from the acidic sulphate solution, the cobalt may be extracted with a suitable organic reagent to create a cobalt loaded organic phase. Those familiar with solvent extraction chemistry will appreciate that only cations will chemically transfer to the organic reagent, while anions will remain with the aqueous phase. Consequently there has been a separation of cobalt from anionic impurities such as sulphate, chloride and nitrate ions.

Most suitably the organic reagent is a phosphoric acid derivative dissolved in kerosene and modified with an aliphatic long chain alcohol. A preferred organic reagent to effect the transfer of cobalt from an acid medium to an ammoniacal ammonium carbonate medium was found to be a mixture of di(2-ethylexyl)phosphoric acid, iso-tridecanol and aliphatic kerosene in suitable proportions to yield optimum extraction and stripping properties.

The reaction generally takes place in mixer settler extraction cells. Some cationic impurities may also transfer to the organic phase.

The cobalt loaded organic reagent exiting the extraction cells may also physically remove some aqueous phase containing sulphate, and in order to remove this contamination, the cobalt loaded organic reagent may be transferred to mixer settler scrub cells. An aqueous scrub liquor which may be either dilute ammonia, dilute ammonium carbonate or deionized water is used to contact the organic phase to remove entrained aqueous sulphate, chloride and nitrate impurities.

The cobalt loaded organic phase exiting the scrub cells is transferred to mixer settler strip cells where the cobalt is stripped from the organic phase by high strength ammoniacal ammonium carbonate solution. A solution of composition 205 to 330 $gl^{-1}$ ammonia and 160 to 300 $gl^{-1}$ carbon dioxide, preferably 255 to 300 $gl^{-1}$ ammonia and 200 to 260 $gl^{-1}$ carbon dioxide, and most preferably 285 $gl^{-1}$ ammonia and 230 $gl^{-1}$ carbon dioxide has been found most effective. It should be understood that by varying the ratio of strip liquor to cobalt loaded organic phase, considerable increases in cobalt concentration in the aqueous strip phase can be achieved. The nature of the cobalt rich ammoniacal liquor is illustrated by the data in Table 2.

TABLE 2

|  | Co | $SO_4^{2-}$ |
|---|---|---|
| Cobalt Sulphate Feed Liquor | 50 $gl^{-1}$ | 100 $gl^{-1}$ |
| Loaded Ammoniacal Liquor | 80 $gl^{-1}$ | 5 ppm |

Nickel may now be removed from the ammoniacal liquor. The separation of nickel from cobalt in ammoniacal carbonate liquors is influenced greatly by two factors:

(i) the presence of cobalt (II) ammines, and (ii) the ammonia concentration of the cobalt rich liquor.

In order to effectively remove nickel from the cobalt rich ammoniacal liquor produced by the cationic transfer process outlined above, the labile cobalt II ammines should be converted to stable cobalt III tetraammine. This is generally achieved by spraying the cobalt rich ammoniacal liquor with air or oxygen and hydrogen peroxide in order to oxidize the cobalt II to cobalt III. During this oxidation step, the cobalt II ammine concentration is generally lowered from about 20 $gl^{-1}$ to about 50 ppm. The cobalt III tetraammine rich ammoniacal liquor may be subjected to controlled distillation to lower the uncomplexed $NH_3$ concentration to approximately 20–60 $gl^{-1}$, preferably about 40 $gl^{-1}$ without destabilizing the cobalt ammine and causing precipitation of solids in the distillation column. Cooling of this ammoniacal liquor is preferred to control its temperature prior to transfer to a series of solvent extraction cells to effect nickel removal.

In order to effectively lower the nickel concentration of the cobalt III tetraammine rich ammoniacal liquor to a suitably low value, it is preferred to use an organic reagent with very low residual nickel loading. This is a natural consequence of the equilibrium relationship between an element in an organic and aqueous phase in contact.

The most preferred organic reagent used in this step is either an oxime reagent, for example, an acetophenoneoxime or salicylaldoxime, or a substituted beta diketone, in kerosene and modified by the addition of a long chain aliphatic alcohol, for example iso-tridecanol, iso-undecanol, iso-dodecanol, and the corresponding linear type. The preferred reagent is a mixture of 2-hydroxy-5-t-nonyl acetophenoneoxime in aliphatic kerosene modified by the addition of iso-tridecanol. This reagent stream may be contacted with high strength ammoniacal ammonium carbonate liquor, with a typical concentration of from 205 to 330 $gl^{-1}$ ammonia, preferably 280 $gl^{-1}$, and 160 to 300 $gl^{-1}$ carbon dioxide, preferably 230 $gl^{-1}$, to remove nickel from the organic reagent. This reaction generally takes place in a series of mixer settler cells at a strip cell temperature of between 35° to 55° C. for a period of between 30 seconds and 30 minutes in each cell, preferably 3 minutes.

The nickel free organic reagent may then contact the cobalt III tetraammine rich ammoniacal liquor to remove the nickel impurity from the cobalt liquor. This reaction may be carried out in mixer settlers and the usual factors of organic to aqueous ratio, temperature, residence time in the mixer boxes and numbers of strip and extract cells should be optimized. For example, a suitable organic to aqueous ratio may be 0.2:1 to 5:1, preferably 1:1 to 2:1, at a temperature in the extract cells of between 35° C. and 60° C., and for a period of between 30 seconds and 30 minutes, preferably about 3 minutes.

The effectiveness of this circuit is illustrated by the data presented in Table 3.

TABLE 3

|  | Co | Ni |
|---|---|---|
| Ammoniacal Feed Liquor | 60 $gl^{-1}$ | 1.8 $gl^{-1}$ |
| Treated Liquor | 60 $gl^{-1}$ | 1 ppm |

Copper and manganese, which are usually present at levels of up to 20 ppm in the ammoniacal feed liquor are also extracted to residual levels of less than 2 ppm during this extraction.

The cobalt III tetraammine rich ammoniacal liquor essentially free of nickel, iron, zinc, copper, manganese, sulphate and chloride ions may then be subjected to filtration through an activated carbon bed (to scavenge any entrained organic reagent removed from the nickel extraction circuit) before being contacted with a suitably conditioned ion exchange resin in order to remove any residual calcium and magnesium.

A number of ion exchange resins were tested. However, given the nature of the feed solution and the duty required from the ion exchange resin, the most preferred is an iminodiacetate acid chelating ion exchange resin with a high affinity for calcium and magnesium. Given the nature of the feed solution, cobalt III tetraammine rich with calcium and magnesium in ammoniacal ammonium carbonate, it is most preferred that the resin be conditioned prior to use to avoid the evolution of gas and disruption of the resin bed during operation. It will be appreciated that during ion exchange resin operations, gas evolution may have a detrimental effect on the operating efficiency of an ion exchange system.

For continuous operation, three individual ion exchange resin columns are most preferred, two operating in series with the third on standby following regeneration. This enables control of the calcium and magnesium impurities associated with cobalt exiting the ion exchange resin system. The effectiveness of this system is illustrated by the data in Table 4.

TABLE 4

|  | Co | Mg | Ca |
|---|---|---|---|
| Ammoniacal Feed Liquor | 60 $gl^{-1}$ | 200 ppm | 50 ppm |
| Treated Liquor | 60 $gl^{-1}$ | 1 ppm | 1 ppm |

The cobalt rich ammoniacal liquor exiting the ion exchange resin system contains extremely low levels of both cationic and anionic impurities. The cobalt III tetraammine complex, while stable at ambient temperatures, is readily destroyed at elevated temperatures forming an insoluble cobaltic oxide hydroxide virtually free of any contaminating anions such as sulphate, chloride and nitrate.

In order to recover the cobalt in an intermediate form, in one preferred way, the cobalt III tetraammine rich ammoniacal liquor may be delivered continuously under controlled conditions to a multi-tray distillation column heated with steam. The off gases are condensed and recovered while the aqueous slurry is pumped to a thickener to recover the suspended cobaltic oxide hydroxide solids.

These solids, because of their composition, particle size and purity, are an ideal intermediate from which to prepare a range of cobalt end products.

Typical composition of the cobaltic oxide hydroxide solids produced is given in Table 5.

TABLE 5

|  | Typical Value % |  | Typical Value % |
|---|---|---|---|
| Co | 64 | Mg | 0.001 |
| Ni | 0.001 | Ca | 0.001 |
| Fe | 0.001 | Al | 0.001 |
| Cu | 0.001 | Si | 0.001 |
| Zn | 0.001 | Na | 0.001 |
| Mn | 0.001 | Cl | <0.001 |

As an alternative step, the cobalt liquor exiting the ion exchange resin system may also be treated in a reductive step by contacting the liquor with finely divided pure cobalt metal powder to reduce the cobalt III tetraammine to labile cobalt II ammine.

This reaction may take place in an inert atmosphere at from 25° C. to 35° C. and results in the precipitation of cobalt hydroxy carbonate solids. The solution is distilled to recover ammonia and carbon dioxide while driving the precipitation reaction to completion.

The process flow diagram (FIG. 1) for the present invention illustrates the injection of air (1) into four reactor units (A), (B), (C) and (D) and the injection of oxygen (2) into two reactor units (E) and (F) at atmospheric pressure. The reaction temperature can be controlled at the required value, 60° to 90° C., by the circulation of water or steam through appropriately positioned coiled tube. The reaction period can be adjusted to achieve the degree of solubilization of cobalt sulphide solids to soluble cobalt salts required. The liquor leaving the final reaction unit (F) is a solution of cobalt sulphate of pH less than 2.5 units and cobalt concentration varying from 30 to 90 $gl^{-1}$ and which is passed through a filter (G) to remove any particulate matter.

For the extraction of cationic impurities, iron and zinc, it is most desired that the iron present in stream (3) exiting filter (G) be treated with a strong oxidant, for example hydrogen peroxide stream (4), to ensure only ferric ($Fe^{3+}$) ions are present prior to entering the first mixer settler extraction cell (H).

It is also most desired that the oxidized stream (5) during its progress through the mixer settler cells (H) and (I) is maintained at a pH of less than 2.8 units to eliminate the potential for the precipitation of ferric hydroxide within the solvent extraction circuit. For the extraction of zinc also present in stream (5) to go to completion, a pH of 3.5 units is most desired, and therefore a basic reagent injection system (6) is required to maintain all the extraction cells (H), (I), (J) and (K) at the optimum pH to remove in the first case ferric iron and then to remove zinc. The stream is contacted with an organic reagent specific for the removal of ferric iron and zinc impurities, most preferably a phosphinic acid derivative.

The additional mixer settler cells illustrated in FIG. 1 are required to first remove any entrained cobalt rich aqueous phase from the iron and zinc loaded organic reagent stream (8). Cells (L) and (M) are used for this purpose. The scrub stream (9) used for this purpose may be water. The cobalt free iron and zinc loaded organic reagent (10) exiting scrub cell (M) is then subjected to stripping with dilute sulphuric acid (11) in mixer settler units (N), (O), (P) and (Q) before exiting mixer settler cell (Q) as stream (12) stripped organic reagent. This reagent stream again being available to extract iron and zinc on a continuous basis. Stream (13) is a waste stream containing iron and zinc sulphate.

The cobalt sulphate solution stream (7), essentially free of iron and zinc contaminants, is pumped to mixer settler cell (R) where it is contacted with a suitable volume of an organic reagent mixture, for example, a mixture of di(2-ethylhexyl)phosphoric acid, iso-tridecanol and aliphatic kerosene, effecting a transfer of cobalt from the aqueous phase to the organic phase.

Three mixer settler extraction cells (R), (S) and (T) were found adequate to maximize the cobalt extraction and the stream (14) leaving cell (T) is essentially cobalt free. The cobalt loaded organic reagent exiting extraction cell (R), stream (15), may be contaminated with physically associated aqueous liquor containing anionic impurities. Since the object of the above transfer step is to separate cobalt from anionic impurities, it is most preferred to pump the cobalt loaded organic reagent to mixer settler scrub cells where the organic phase is contacted with deionized water (16) to remove impurities. Two scrub cells (U) and (V) are used and the scrub stream containing some cobalt (20) is returned to extraction cell (R) for recovery.

The scrubbed cobalt loaded organic reagent (17) exiting scrub cell (V) enters mixer settler strip cell (W) where it contacts ammoniacal ammonium carbonate strip liquor leaving strip cell (X). This countercurrent progression of organic and aqueous phases continues through the four strip cells (V), (W), (X) and (Y) required to recover the cobalt from the organic reagent. The most suitable liquor for the above described cobalt stripping procedure was found to be one containing 285 $gl^{-1}$ of ammonia and 230 $gl^{-1}$ of carbon dioxide.

The ammoniacal ammonium carbonate strip liquor stream (18), free of cobalt, enters strip cell (Z) and exits strip cell (W), stream (19) containing approximately 80 $gl^{-1}$ cobalt. The cobalt rich liquor stream (19) is pumped to two reactor vessels in series (A1) and (A2) and air and/or oxygen (21) injected during vigorous agitation of the liquor to convert cobalt II ammines to cobalt III ammines.

The oxidized liquor exiting vessel (A2) is agitated in vessel (A3) during the injection of hydrogen peroxide (22) to complete the oxidation cycle. The oxidized liquor (23) will have been depleted in ammonia to some extent, as the injection of air will remove free ammonia, the extent of removal depending on the reaction time. The oxidized liquor (23) rich in cobalt III ammines may now be subjected to controlled distillation in column (A4) to lower the uncomplexed ammonia concentration to approximately 40 $gl^{-1}$ without destabilizing the cobalt ammines and causing precipitation in the distillation column. Steam (24) is injected into the column to effect the removal of ammonia. Stream (25) is an off gas stream containing $NH_3$, $CO_2$ and steam and is condensed for recycling.

In order to effectively lower the nickel concentration of the cobalt III tetraammine rich ammoniacal liquor exiting the distillation column, stream (26), to a suitably low value, it is preferred to use an organic reagent with very low residual nickel loading. This is a natural consequence of the equilibrium relationship between an element in an organic and aqueous phase in contact.

The most preferred organic reagent used in this step is a mixture of 2-hydroxy-5-t-nonyl acetophenoneoxime in aliphatic kerosene modified by the addition of iso-tridecanol. This reagent stream (27) enters mixer settler strip cells (A8), (A9) and (A10) where it is contacted with concentrated ammoniacal ammonium carbonate liquor (28), typically composed of 280 $gl^{-1}$ ammonia and 230 $gl^{-1}$ carbon dioxide, to remove nickel from the organic reagent. The nickel free organic reagent stream (29) now contacts the cobalt III tetraammine rich ammoniacal liquor (26) in a series of 3 extract mixer settler units (A5), (A6) and (A7) to remove the nickel impurity from the cobalt liquor. A suitable organic to aqueous phase ratio may be 1:1 at an extract cell temperature of between 35° and 60° C. and a strip cell temperature of between 35° and 55° C. for a period of between 30 seconds and 30 minutes.

The cobalt III tetraammine rich ammoniacal liquor (30) is then passed through two ion exchange columns in series, (A11) and (A12), to lower calcium and magnesium impurities to acceptable levels.

In order to recover the cobalt as an intermediate, the cobalt III tetraammine rich ammoniacal ammonium carbonate liquor (31) is delivered continuously under controlled conditions to a multi tray distillation column (A13) and heated with steam. The aqueous slurry (32) is pumped to a thickener (A14) to recover the suspended cobaltic oxide hydroxide solids prior to filtration through filter (A15) to produce a moist filter cake.

It will also be appreciated that various modifications or alterations may be made to the invention as outlined above without departing from the spirit or ambit described therein, and should be considered to form part of the invention.

What is claimed is:

1. A process for selectively separating unwanted ferric iron and zinc impurities from a cobalt sulphate solution containing said iron and zinc impurities, as well as at least one of chloride and nitrate ion impurities, said process including the steps of:

(i) contacting the cobalt sulphate solution with bis(2,4,4-trimethylpentyl)phosphinic acid in aliphatic kerosene at an initial pH of less than 2.8 to selectively extract the majority of the unwanted ferric iron impurities from the cobalt sulphate solution; and (ii) raising the pH of the solution to about 3.5 while maintaining contact with the bis(2,4,4-trimethylpentyl) phosphinic acid in aliphatic kerosene in order to extract zinc impurities and any remaining ferric iron impurities from the cobalt sulphate solution.

2. A process according to claim 1, wherein impure cobalt containing solids are solubilized prior to step (i) to form the cobalt sulphate solution.

3. A process according to claim 1, wherein the cobalt sulphate solution has an initial pH of less than 2.5 and a cobalt concentration of from 30 to 90 $gl^{-1}$.

4. A process according to claim 1, wherein the cobalt sulphate solution is treated with a strong oxidant to convert any iron impurities to ferric ($Fe^{3+}$) ions prior to treating the solution with the bis(2,4,4-trimethylpentyl)phosphinic acid of step (i).

5. A process according to claim 1, wherein the initial pH is from about 2.1 to about 2.6.

6. A process according to claim 1, wherein said process further comprises retaining the cobalt sulphate solution of step (ii) essentially free of iron and zinc impurities for further processing.

7. A process according to claim 1, wherein said cobalt sulphate solution contains chloride ions.

8. A process according to claim 1, wherein said cobalt sulphate solution contains nitrate ions.

9. A process for selectively separating unwanted ferric iron and zinc impurities from a cobalt sulphate solution containing said iron and zinc impurities, as well as at least one of chloride and nitrate ion impurities, said process including the steps of:
  (i) contacting the cobalt sulphate solution with a phosphinic acid derivative in aliphatic kerosene at an initial pH of less than 2.8 to selectively extract the majority of the unwanted ferric iron impurities from the cobalt sulphate solution; and
  (ii) raising the pH of the solution to about 3.5 while maintaining contact with the phosphinic acid derivative in aliphatic kerosene to extract zinc impurities and any remaining ferric iron impurities from the cobalt sulphate solution.

10. A process according to claim 9, wherein the organic reagent is bis(2,4,4-trimethylpentyl)phosphinic acid in aliphatic kerosene.

11. A process according to claim 9, wherein impure cobalt containing solids are solubilized prior to step (i) to form the cobalt sulphate solution.

12. A process according to claim 9, wherein the cobalt sulphate solution has an initial pH of less than 2.5 and a cobalt concentration of from 30 to 90 $gl^{-1}$.

13. A process according to claim 9, wherein the cobalt sulphate solution is treated with a strong oxidant to convert any iron impurities to ferric ($Fe^{3+}$) ions prior to treating the solution with the organic reagent of step (i).

14. A process according to claim 9, wherein said cobalt sulphate solution contains chloride ions.

15. A process according to claim 9, wherein said cobalt sulphate solution contains nitrate ions.

16. A process for selectively separating unwanted ferric iron and zinc impurities from a cobalt sulphate solution containing said iron and zinc impurities, as well as anionic impurities, said process including the steps of:
  (i) contacting the cobalt sulphate solution with bis(2,4,4-trimethylpentyl) phosphinic acid in aliphatic kerosene at an initial pH of less than 2.8 to selectively extract the majority of the unwanted ferric iron impurities from the cobalt sulphate solution; and
  (ii) raising the pH of the solution to about 3.5 while maintaining contact with the bis(2,4,4-trimethylpentyl) phosphinic acid in aliphatic kerosene in order to extract zinc impurities and any remaining ferric iron impurities from the cobalt sulphate solution.

17. A process according to claim 16, wherein impure cobalt containing solids are solubilized prior to step (i) to form the cobalt sulphate solution.

18. A process according to claim 16, wherein the cobalt sulphate solution has an initial pH of less than 2.5 and a cobalt concentration of from 30 to 90 $gl^{-1}$.

19. A process according to claim 16, wherein the cobalt sulphate solution is treated with a strong oxidant to convert any iron impurities to ferric ($Fe^{3+}$) ions prior to treating the solution with the bis(2,4,4-trimethylpentyl)phosphinic acid of step (i).

* * * * *

UNITED STATES PATENT AND TRADEMARK OFFICE
CERTIFICATE OF CORRECTION

PATENT NO. : 6,048,506
DATED : April 11, 2000
INVENTOR(S) : John E. Fittock, et. al.

It is certified that error appears in the above-identified patent and that said Letters Patent is hereby corrected as shown below:

Title page, item [30] under Foreign Application Priority data, change "Austria" to read --Austria [AU] Australia--

Signed and Sealed this

Twenty-second Day of May, 2001

Attest:

NICHOLAS P. GODICI

*Attesting Officer*  *Acting Director of the United States Patent and Trademark Office*

UNITED STATES PATENT AND TRADEMARK OFFICE
CERTIFICATE OF CORRECTION

PATENT NO. : 6,048,506
DATED : April 11, 2000
INVENTOR(S) : John E. Fittock, Malcolm J. Price, John G. Reid It is certified that error appears in the above-identified patent and that said Letters Patent is hereby corrected as shown below:

<u>Title page,</u>
Under Item "[30] Foreign Application Priority Data", please delete in its entirety and insert therefor:

-- Oct. 29, 1993      [AU]      Australia ...................... PM 2092 --

Signed and Sealed this

Thirteenth Day of November, 2001

*Attest:*

NICHOLAS P. GODICI
*Attesting Officer*      *Acting Director of the United States Patent and Trademark Office*